S. SANDERS.
Steam Heater.
No. 104,501.                               Patented June 21, 1870.
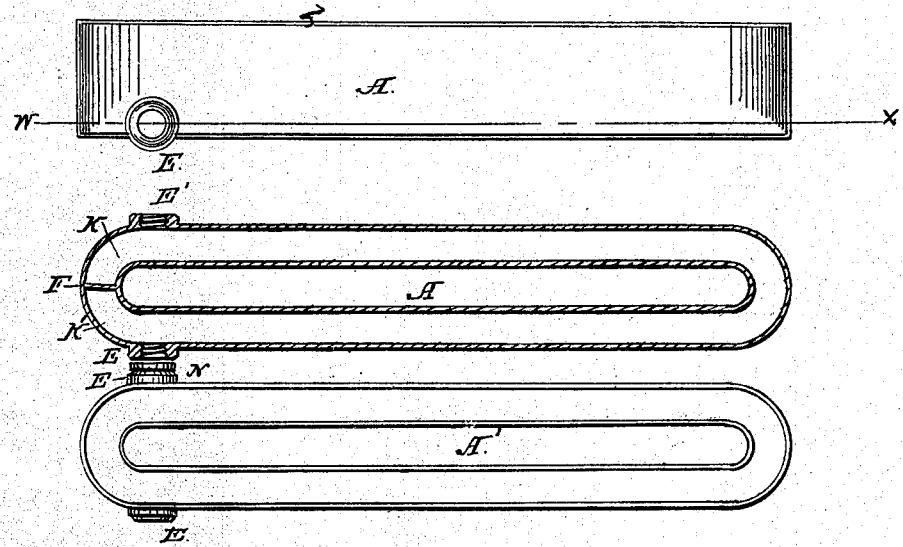
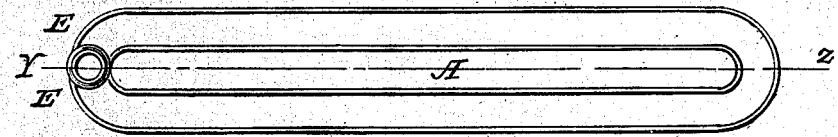
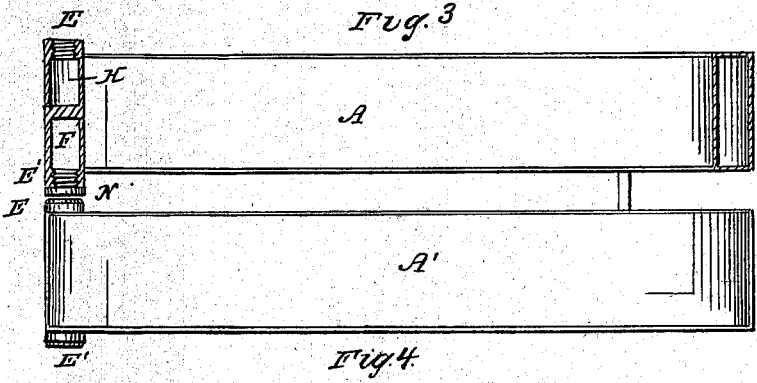
WITNESSES:                                INVENTOR.
John A Hall                               Sidney Sanders.
John M Stebbins

UNITED STATES PATENT OFFICE.

SIDNEY SANDERS, OF SPRINGFIELD, MASSACHUSETTS.

STEAM-RADIATOR.

Specification forming part of Letters Patent No. 104,501, dated June 21, 1870.

I, SIDNEY SANDERS, of Springfield, Hampden county, Massachusetts, have invented an Improved Radiator for Warming and Heating by Steam, of which the following is a practical description, reference being had to the accompanying drawing, making a part of this specification.

My invention relates to a radiator designed more especially for indirect heating; and consists in making such radiator in the form or nature of a reverberating flue, and providing the same with connection-apertures, so arranged that in a series of radiators such apertures are or may be in one and the same straight line, the object thereof being to secure in radiators intended to be made of cast-iron a forced circulation of steam, and to make and preserve the joints or connections of a series of such radiators steam-tight.

In the accompanying drawing, Figure 1 is a side elevation of my improved radiator; Fig. 2, a plan of two such radiators connected, one of which, A, is sectioned horizontally through line W X; Fig. 3, a plan of my improved radiator, showing a different arrangement of the connection-apertures; and Fig. 4, a side elevation of two radiators connected at apertures, arranged as in Fig. 3, one of which radiators, A, is sectioned vertically through line Y Z.

For strength, symmetry, and extent of plain radiating-surface, I prefer to make my radiators in plan of a link form; but when they are to be arranged collaterally, as in Fig. 2, they may well be made in plan of a U form; and whether the ends thereof be circular or angular is entirely matter of taste and convenience.

A indicates a radiator as a whole; H, the reverberating flue or steam-duct, which is entirely stopped off at one end in the link form by the partition F, and in the U form by the respective halves of such partition or headings K K', Fig. 2.

E E' are the connection-apertures, tapped out and arranged one on each side of and near to partition F, such partition being inclined or deflected, therefore, in case of apertures arranged as in Figs. 3 and 4.

I arrange radiators A A' horizontally; otherwise the water resulting from condensation submerges the connection-apertures and stops all circulation. Thus arranged, I connect such radiators by means of a right and left screw-threaded coupling, N, and provide the last of a series with an air-valve, and connect the whole by means of ordinary pipes and valves with an appropriate boiler.

I cast my radiator of iron; but it may be made of any suitable material.

It is obvious that steam entering flue H at aperture E must traverse the whole length of such flue before issuing therefrom at aperture E'; and the same is true of any series of such radiators. It is also obvious that the connections, being of the screw-thread order, and in one and the same straight line, are not affected by the expansion or contraction of the radiators, and thus the object of my invention is attained.

I am aware of the existence of various cast-iron radiators, one of which, externally of a link form, constitutes an endless flue; but such is not my radiator, and I disclaim the invention of any radiator embodying an endless flue. I also disclaim the invention of the separate parts or features of my own radiator; but What I do claim as my invention is—

The radiator A, provided with apertures E E', partition F, and reverberating flue H, substantially as specified.

SIDNEY SANDERS.

Witnesses:
 JOHN M. STEBBINS,
 JOHN A. HALL.